Patented Dec. 9, 1924.

1,518,189

UNITED STATES PATENT OFFICE.

JOHN THOMPSON ELLIS, OF KALGOORLIE, WESTERN AUSTRALIA, AUSTRALIA, ASSIGNOR, BY MESNE ASSIGNMENTS, TO JOHN DUNCAN WHYTE, OF PERTH, AUSTRALIA.

POROUS COMPOSITION OF MATTER.

No Drawing. Application filed January 17, 1923. Serial No. 613,310.

*To all whom it may concern:*

Be it known that I, JOHN THOMPSON ELLIS, of Kalgoorlie, in the State of Western Australia, Commonwealth of Australia, have invented an Improvement in a Porous Composition of Matter, of which the following description is a specification.

This invention relates to an improved porous composition of matter.

The composition is of such a character that when wetted its capillary interstices give enormous surface exposure of liquid to evaporative influences. As a result rapid evaporation ensues with a corresponding withdrawal of sensible heat that connotes a marked decrease of temperature in the vicinity.

In consequence such composition has been found of considerable utility in the construction of cooling safes, or other large or small receptacles of a cognate character.

The invention particularly relates to the combination and method of combining certain ingredients to give this porous composition of matter.

These ingredients comprise plaster of Paris, asbestos and wood charcoal. The mechanical stability of the mixture is preferably increased by the addition of a hardening compound or compounds.

To enable the invention to be more completely understood, a preferred embodiment will now be described in detail. It is to be understood, however, that modifications may be made by persons skilled in the art, but such modifications, whether by addition, subtraction, or substitution of ingredients, may still be within the scope of the appended claims.

The plaster of Paris 1 ton (2240 lbs) is placed in a mixing vessel together with 225 lbs. of ground charcoal. Then the asbestos used (52½ lbs.) is thoroughly calcined preferably to a temperature of 750° C., mainly with the object of thoroughly opening up its interstices. The calcined asbestos together with 24 lbs. of boric acid is then added to the plaster and charcoal. This dry mixture is thoroughly stirred until it is mechanically homogeneous. Then 1600 lbs. of water are mixed with 4 lbs. of ammonia (S. G. .880) and added to the dry ingredients and thoroughly incorporated therewith, yielding a thick paste. This paste is poured into moulds so as to give sheets, bottles, or other receptacles or portions thereof.

After 20 minutes the mixture will have set, although considerable strength will not develop until after it has been setting for about two hours.

It will of course be understood that the proportions as mentioned are capable of variation. Due regard is to be given to the purity of the ingredients, as divergence from normal standards may necessitate adjustments in quantities to give the best results.

In the mixture above described, the plaster of Paris will be considered as the setting body; the asbestos as the "fibrous" element; the charcoal as the gas occluding or deodorizing element, whilst the ammonia and boric acid are hardened reagents.

If the composition has been cast into sheets, these are used for building cooling safes or chambers, whilst if the composition has been cast into the form of relatively smaller vessels, such as butter coolers, they are used forthwith.

In use the coolers are merely supplied with sufficient liquid to permit adequate evaporation which naturally will be encouraged by positioning the receptacles in a natural or induced air current.

I claim:—

1. A porous composition of matter comprising approximately 40 parts by weight of plaster of Paris, 1 part by weight of asbestos and 4 parts by weight of charcoal.

2. A porous composition of matter comprising the combination of plaster of Paris, calcined asbestos, charcoal, boric acid, and ammonia.

3. A process of forming a porous composition of matter comprising mixing together plaster of Paris, ground charcoal, calcined asbestos, and boric acid, then adding water containing ammonia until a homogeneous paste is obtained and finally pouring such pasty mixture into moulds.

Dated this 26" day of October, 1922.

JOHN THOMPSON ELLIS.

Witnesses:
 FELIX C. COWLE,
 CHAS. CUTBUSH.